Patented July 20, 1937

2,087,457

UNITED STATES PATENT OFFICE 2,087,457

DECOLORIZATION OF RESINS

Charles A. Thomas and William H. Carmody, Dayton, Ohio, assignors, by mesne assignments, to Monsanto Chemical Company, a corporation of Delaware No Drawing. Application May 23, 1934, Serial No. 727,065. Renewed December 21, 1936

7 Claims. (Cl. 260—7)

This invention relates to a decolorized resin or resinous material and a method of producing same.

One of the principal objects of this invention is to produce a decolorized resin which is pale in color or substantially colorless, from a resin which is decidedly darker in color.

Another object of the invention is to provide a method for decolorizing a resin which is not successfully decolorized by ordinary decolorizing methods.

Another object of the invention is to provide an effective and practical method for producing substantially neutral synthetic resins which are substantially colorless.

Still another object of the invention is to provide a method for decolorizing a coumarone-indene resin by treatment with activated clay in the presence of a non-aromatic solvent.

Other objects and advantages of the invention will be apparent from the following description and appended claims.

The method of the present invention is particularly effective in decolorizing a substantially neutral synthetic resin, such for example as coumarone-indene type resins or a neutral hydrocarbon resin produced from unsaturated hydrocarbons of coal tar or petroleum origin. Coumarone-indene resins may be produced from any coumarone-indene containing compounds or mixtures of such compounds, such for example as solvent naphtha, by polymerization with a suitable catalyst, such as sulphuric acid or metallic halide, or by any of the other known methods. Hydrocarbon resins produced from unsaturated petroleum hydrocarbons or from crude mixtures of such hydrocarbons, such as cracked petroleum distillate, are also suitable for use in the present invention. Other hydrocarbon resins or hydrocarbon derivative resins, such as resins produced from styrene and vinyl compounds, are effectively decolorized by the method of this invention. Hydrocarbon resins and methods of producing them are described and claimed in the Patent 1,836,629 to Chas. Allen Thomas, dated December 15, 1931, and in the copending applications of Chas. A. Thomas, Serial No. 461,807, filed June 17, 1930, now Patent No. 2,039,363; Chas. A. Thomas, Serial No. 518,132, filed February 25, 1931, now Patent No. 2,039,365; Chas. A. Thomas, Patent No. 1,947,626, issued February 20, 1934; Chas. A. Thomas, Serial No. 494,692, filed November 10, 1930, now Patent No. 2,023,495; Chas. A. Thomas, Patent No. 1,939,932, issued December 19, 1933; Chas. A. Thomas, Serial No. 528,706, filed April 8, 1931, now Patent No. 1,982,707; Chas. A. Thomas and William H. Carmody, Serial No. 599,161, filed March 16, 1932, now Patent No. 1,982,708.

Attention is directed to our co-pending application Serial No. 617,478, filed June 15, 1932, now Patent No. 2,060,404, in which decolorization of unsaturated hydrocarbon resins is covered specifically. In producing these resins a crude mixture of hydrocarbons such as is contained in cracked distillate, or certain fractions of cracked distillate, or various substantially pure petroleum hydrocarbons, or mixtures of these, as set forth in the above mentioned patent and co-pending applications, may be utilized as starting materials. The chosen starting materials, with or without a suitable diluent, such as gasoline or benzol, are reacted with a metallic halide catalyst such as anhydrous aluminum chloride, to produce a resinous reaction product. The reacted or polymerized mixture is neutralized, for example with an ammonia-alcohol mixture, to precipitate the catalyst. The neutralized and precipitated catalyst is substantially completely separated from the resinous reaction product. The unsaturated hydrocarbon resin thus produced ranges from light amber to dark brown in color, depending on the starting materials used and other factors, and is substantially neutral and unsaponifiable.

Various methods for decolorizing such resins have hitherto been tried, without practical success. For example, treatment with adsorbing materials such as charcoal, has been found to have no material effect on the color of these resins. Decolorization of the starting materials before polymerization has been found to have little effect on the color of the polymerized resins.

We have now discovered that when colored resins of the described character are placed in solution in a solvent of the paraffin series such as naphtha or hexane, and treated with fuller's earth or certain activated bleaching clays, the treated resin solution, when removed from the clay as by filtration, is materially lighter in color. For example, a resin solution may be obtained in this manner which is substantially colorless. When the solvent is removed from such solution, as by distillation, the remaining hard resin is still very light in color or substantially colorless.

We have also found that the resins may be decolorized if desired, without use of a solvent. That is, resin and clay may be melted together with rapid stirring, at a temperature high enough to drive off water from the clay, for example at a temperature of the order of 210° C., for 5 to 10 minutes. The fused mixture is then dissolved in a suitable solvent or mixture of solvents for the coumarone-indene resin or the polymerized hydrocarbon resin, for example, solvents such as commercial "Varnolene", naphtha, hexane and the like. On removal of the clay, as by filtration, a light colored solution is obtained. On removal of the solvent, as by evaporation, a light colored or colorless resin is produced. After removal of the clay by filtration there may result a solution of resin in the solvent which has a dark fluorescent color. If to such a resin solution is added a small proportion (less than 2% by weight based on weight of the resin) of a neutralizing solution, and the mixture is stirred, an immediate lightening in color results. The neutralizing solution used in above proportion may conveniently be an alkaline solution such as a solution containing 60% by volume of 95% ethyl alcohol and 40% by volume of ammonium hydroxide containing 23% $NH_3$ by weight. Such neutralization after clay treatment appears to give a lighter final product. More than one filtration may also be desirable in certain instances, to insure a clear resin product.

When preferred, this decolorizing treatment may also be applied to the described resins at various stages in the production of such resins. As an example of the carrying out of this invention, the following procedure is described.

The resin to be decolorized is first put into solution in the desired solvent, such as naphtha, hexane or pentane. Any desired concentration of solution which is practical for operations such as mixing and filtering may be used.

The solvent used is found to be an important factor in effectiveness of the decolorizing treatment. When benzene, toluene and other aromatic solvents are used, treatment with activated clays has very little decolorizing effect. When non-aromatic or paraffin solvents such as pentane, hexane, naphtha and the like, are used, and the solution treated with certain activated bleaching clays, the resin solution is very effectively decolorized. It is also found that decolorization is more effective in presence of lower boiling solvents, such as pentane, hexane, heptane, the octanes and commercial mixtures of these, such as naphthas.

A finely ground activated bleaching clay is added to the resin solution, and refluxed at from 100°-150° C. for a short period of time, such as 15-minutes to ½ hour. For coumarone-indene type resins this operation is very effectively carried out at temperatures approximating 125° C. The color-producing constituents appear to be decomposed at about 125° C. The de-composed products which cause discoloration of the solution are selectively adsorbed by the clay and practically completely removed. Resins of the described types may be effectively decolorized by the method of this invention at widely varying temperatures, and in many cases, at room temperature. Lower temperatures of decolorization have been found particularly desirable when decolorizing petroleum hydrocarbon resins.

The proportions of clay used may be varied widely, amounts varying from 1 to 100% by weight of the resin treated, having been found effective. However, the decolorizing treatment has been found to be effective with relatively small amounts of clay, so that use of large proportions of clay is not recommended. Amounts of clay as low as 1 gram per 100 cc. of resin solution, such as polymerized crude with naphtha diluent have been found to be effective in decolorizing the resin. Certain imported "activated bleaching clays" as well as commercial fuller's earth, are found particularly effective for use according to this invention. These clays differ from fuller's earth in that they have been activated by a chemical process with acid, washed, neutralized, dried and ground. Two of these clays imported by the Harshaw Chemical Co. of Philadelphia, and sold under the designation "Activated Bleaching Clay H-1", and "Activated Bleaching Clay H-15" have been found very satisfactory for this purpose. These clays are found to give an acid reaction when tested in water suspension with litmus.

The resin solution may also be previously heated to a temperature of the order of 125° C., to decompose the color producing constituents, and the pre-heated solution then treated with clay at room temperature or at higher temperatures, as described above.

After the above described treatment with clay, for example, clay H-1, the resin solution is separated from the clay by any convenient means, as by filtering. The color-bearing constituents of the resin and any insoluble materials remain with the clay, and the filtered resin solution is usually substantially colorless. If the color of the solution has not been lightened to the desired extent, the clay treatment may be repeated, using preferably a fresh batch of clay. The decolorized resin solution is then freed from solvent as by distillation, leaving a hard colorless or very light straw colored resin. This resin is found to produce a clear varnish, and appears to be equivalent in chemical and varnish-making properties to the resin produced in the same manner without the clay treatment.

This decolorizing treatment may also be readily applied to the polymerized mass containing the resinous reaction product, at certain stages of the resin-making process. For example, the polymerized mass at any time after polymerization, may be decolorized with a suitable activated bleaching clay in the manner described above.

While the methods herein described and the products so produced constitute preferred embodiments of this invention, it is to be understood that the invention is not limited to these precise methods or precise products, and that changes may be made therein without departing from the scope of the invention which is defined in the appended claims. Thus, the invention embraces the decolorization of neutral or substantially neutral resins by dissolving the same in non-aromatic hydrocarbon solvents and treating the resulting solution with activated or bleaching clay, having adsorptive properties, under regulated temperature conditions. While the principles of the invention have been described as applied to typical examples of neutral resins, to wit: polymerized hydrocarbon resins and coumarone-indene resins, they are not so limited but apply to others, including polymerized styrol resins, polymerized vinyl ester resins and other substantially neutral resins which are soluble in non-aromatic hydrocarbon spirits.

What we claim is:

1. The method of decolorization of a polymerized resin produced from coumarone-indene, which comprises intimately mixing the polymerized colored resin in solution in a solvent consisting of paraffin hydrocarbon naphtha solvents with a clay, so as to remove coloring materials present in the resin and obtain a decolorized resin substantially equivalent in varnish-making properties to the polymerized colored resin.

2. The method of decolorizing a substantially neutral resin produced by polymerization of coumarone-indene, which comprises mixing the polymerized colored resin in solution in a solvent consisting solely of paraffin hydrocarbon solvents with a bleaching clay, refluxing the mixture at a temperature of the order of 125° C., and separating the resin to obtain a decolorized resin, substantially equivalent in varnish-making properties to the untreated colored resin.

3. The method of decolorizing a polymerized substantially neutral coumarone-indene resin, which comprises intimately mixing the polymerized colored resin in solution in paraffin hydrocarbon naphtha with a bleaching clay, and then separating the clay and adsorbed coloring material from the solution of the resin, to obtain a decolorized resin substantially unchanged in varnish making characteristics.

4. In the production of a substantially completely decolorized synthetic coumarone-indene resin, the method which comprises mixing the polymerized colored resinous product in solution in paraffin hydrocarbon naphtha with a bleaching clay and maintaining the resinous product in naphtha solution in contact with the clay for a period not in excess of one half hour, to obtain a decolorized resinous polymerization product substantially equivalent in varnish-making properties to the colored resinous polymerization product.

5. The method of decolorizing colored polymerized substantially neutral coumarone-indene resin, which comprises intimately mixing the preformed polymerized colored resin in solution in paraffin hydrocarbon naphtha with a bleaching clay, without heating the resin in contact with the clay, and separating the resin from the clay and solvent so as to obtain a decolorized resin substantially the same in varnish making properties as the pre-formed colored resin.

6. In the production of a substantially completely decolorized synthetic coumarone-indene resin, the method which comprises heating a paraffin hydrocarbon naphtha solution of the polymerized colored resinous product to a temperature of the order of 125° C. to decompose the color-producing constituents of the resin, mixing the resulting resinous solution with a bleaching clay, and separating the clay and adsorbed coloring material from the resin, to obtain a decolorized resinous polymerization product substantially equivalent in varnish-making properties to the colored resinous polymerization product.

7. The method of decolorization of a substantially neutral coumarone-indene resin which is soluble in non-aromatic hydrocarbon spirits which comprises intimately mixing the resin with a bleaching clay and a paraffin hydrocarbon naphtha solvent for said resin, and thereafter separating the resin and solvent from the clay.

CHARLES A. THOMAS.
WILLIAM H. CARMODY.